United States Patent
Zhou

(10) Patent No.: US 11,671,693 B2
(45) Date of Patent: Jun. 6, 2023

(54) ELECTRONIC DEVICE, CONTROL METHOD OF THE SAME, AND NON-TRANSITORY COMPUTER-READABLE STORAGE MEDIUM

(71) Applicant: VIVO MOBILE COMMUNICATION CO.,LTD., Guangdong (CN)

(72) Inventor: Jun Zhou, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/675,799

(22) Filed: Feb. 18, 2022

(65) Prior Publication Data
US 2022/0174197 A1 Jun. 2, 2022

Related U.S. Application Data

(63) Continuation of application No. PCT/CN2020/116888, filed on Sep. 22, 2020.

(30) Foreign Application Priority Data

Sep. 29, 2019 (CN) .......................... 201910936808.3

(51) Int. Cl.
*G02F 1/1335* (2006.01)
*H04N 23/57* (2023.01)
(Continued)

(52) U.S. Cl.
CPC ........... *H04N 23/57* (2023.01); *G02F 1/1368* (2013.01); *G02F 1/133331* (2021.01); *G02F 1/133514* (2013.01); *G02F 1/133528* (2013.01)

(58) Field of Classification Search
CPC ........... G02F 1/133528; G02F 1/13312; G02F 1/1368; G02F 1/133514; G02F 1/133331;
(Continued)

(56) References Cited

U.S. PATENT DOCUMENTS

2008/0100784 A1 5/2008 Haruyama
2012/0206669 A1* 8/2012 Kim ................... G02F 1/133308
349/153
(Continued)

FOREIGN PATENT DOCUMENTS

CN 207264062 U 4/2018
CN 108594524 A 9/2018
(Continued)

OTHER PUBLICATIONS

The First Office Action of Priority Application No. CN 201910936808.3 issued by the Chinese Patent Office dated Mar. 2, 2021.
(Continued)

*Primary Examiner* — Hoan C Nguyen
(74) *Attorney, Agent, or Firm* — IP & T Group LLP

(57) ABSTRACT

An electronic device includes a housing, a display module, a camera and a drive structure. The display module includes a backlight module and a liquid crystal display, the backlight module includes a fixed backlight component and a movable backlight component, the liquid crystal display includes a first base assembly, a second base assembly, and a liquid crystal layer disposed between the first base assembly and the second base assembly, the second base assembly is disposed between the liquid crystal layer and the backlight module and includes a movable block, the movable block is disposed opposite to the movable backlight component, and the drive structure is connected with the camera, can drive the camera to move towards the movable backlight component, and can drive, via the camera, the movable backlight component and the movable block to squeeze the liquid crystal layer.

13 Claims, 2 Drawing Sheets

(51) Int. Cl.
*G02F 1/1333* (2006.01)
*G02F 1/1368* (2006.01)

(58) Field of Classification Search
CPC ............ G02F 1/133371; H04N 23/57; H04M 1/0266; H04M 1/0264
See application file for complete search history.

(56) References Cited

U.S. PATENT DOCUMENTS

| | | | |
|---|---|---|---|
| 2018/0011373 | A1* | 1/2018 | Zhou .................. G02F 1/13454 |
| 2020/0236259 | A1 | 7/2020 | Nakamura et al. |
| 2021/0333633 | A1 | 10/2021 | Mei et al. |
| 2021/0397215 | A1 | 12/2021 | Yin et al. |
| 2021/0405407 | A1* | 12/2021 | Sun .................. G02F 1/133331 |

FOREIGN PATENT DOCUMENTS

| | | |
|---|---|---|
| CN | 108683764 A | 10/2018 |
| CN | 108803146 A | 11/2018 |
| CN | 108885376 A | 11/2018 |
| CN | 109283736 A | 1/2019 |
| CN | 208386628 U | 1/2019 |
| CN | 109545099 A | 3/2019 |
| CN | 109782488 A | 5/2019 |
| CN | 208834050 U | 5/2019 |
| CN | 109901327 A | 6/2019 |
| CN | 110072060 A | 7/2019 |
| CN | 110187559 A | 8/2019 |
| CN | 209356799 U | 9/2019 |
| CN | 110673371 A | 1/2020 |
| EP | 3785073 A1 | 3/2021 |
| JP | 2011-221315 A | 11/2011 |
| WO | 2014/126662 A1 | 8/2014 |
| WO | 2018/216545 A1 | 11/2018 |

OTHER PUBLICATIONS

International Search Report and Written Opinion of International Application No. PCT/CN2020/116888 issued by the Chinese Patent Office dated Dec. 30, 2020.

* cited by examiner

ELECTRONIC DEVICE, CONTROL METHOD OF THE SAME, AND NON-TRANSITORY COMPUTER-READABLE STORAGE MEDIUM

CROSS-REFERENCE TO RELATED APPLICATIONS

This application is a Bypass Continuation application of PCT/CN2020/116888 filed on Sep. 22, 2020, which claims priority to Chinese Patent Application No. 201910936808.3 filed on Sep. 29, 2019, which are incorporated herein by reference in their entirety.

TECHNICAL FIELD

The present disclosure relates to the technical field of communications devices, and in particular, to an electronic device, a control method of the same, and a non-transitory computer-readable storage medium.

BACKGROUND

As user demands increase, performance of electronic devices is continuously optimized. Currently, screen-to-body ratios of electronic devices become increasingly larger. To enlarge a screen-to-body ratio of an electronic device, a camera that is disposed on a frame of a conventional device is disposed below a display module. To ensure normal shooting of the camera, the display module needs to be provided with a light-transmitting area. The camera senses ambient light through the light transmitting area, thereby implementing shooting.

SUMMARY

The present disclosure provides an electronic device, including a housing, a display module, a camera, and a drive structure, where the camera and the drive structure are disposed in an inner cavity formed by the display module and the housing;
the display module includes a backlight module and a liquid crystal display, where the backlight module is disposed between the liquid crystal display and the camera;
the backlight module includes a fixed backlight component and a movable backlight component, where a first sliding hole is formed in the fixed backlight component, the first sliding hole is formed opposite to the camera, and the movable backlight component is slidably disposed in the first sliding hole;
the liquid crystal display includes a first base assembly, a second base assembly, and a liquid crystal layer disposed between the first base assembly and the second base assembly, the second base assembly is disposed between the liquid crystal layer and the backlight module, the second base assembly includes a movable block, and the movable block is disposed opposite to the movable backlight component; and
the drive structure is in driving connection with the camera, the drive structure can drive the camera to move towards the movable backlight component, and the drive structure can drive, via the camera, the movable backlight component and the movable block to squeeze the liquid crystal layer, so that an area of the liquid crystal layer opposite to the movable block becomes thinner.

The present disclosure further provides a control method of an electronic device. The electronic device is the foregoing electronic device. The control method includes following steps:
receiving a first input; and
driving, via the drive structure in response to the first input, the camera to move towards the movable backlight component and the movable block.

The present disclosure further provides an electronic device, including:
a receiving unit, configured to receive a first input; and
a control unit, configured to drive, via the drive structure in response to the first input, the camera to move towards the movable backlight component and the movable block.

The present disclosure further provides an electronic device, including a processor, a memory, and a computer program stored in the memory and executable on the processor, where when the computer program is executed by the processor, the foregoing control method is implemented.

The present disclosure further provides a non-transitory computer-readable storage medium.

The non-transitory computer-readable storage medium stores a computer program, and when the computer program is executed, the foregoing control method is implemented.

BRIEF DESCRIPTION OF DRAWINGS

The accompanying drawings described herein are intended to provide an understanding of the present disclosure, and constitute a part of the present disclosure. The illustrative embodiments of the present disclosure and descriptions thereof are intended to describe the present disclosure, and do not constitute limitations on the present disclosure. In the accompanying drawings.

Figure 1:
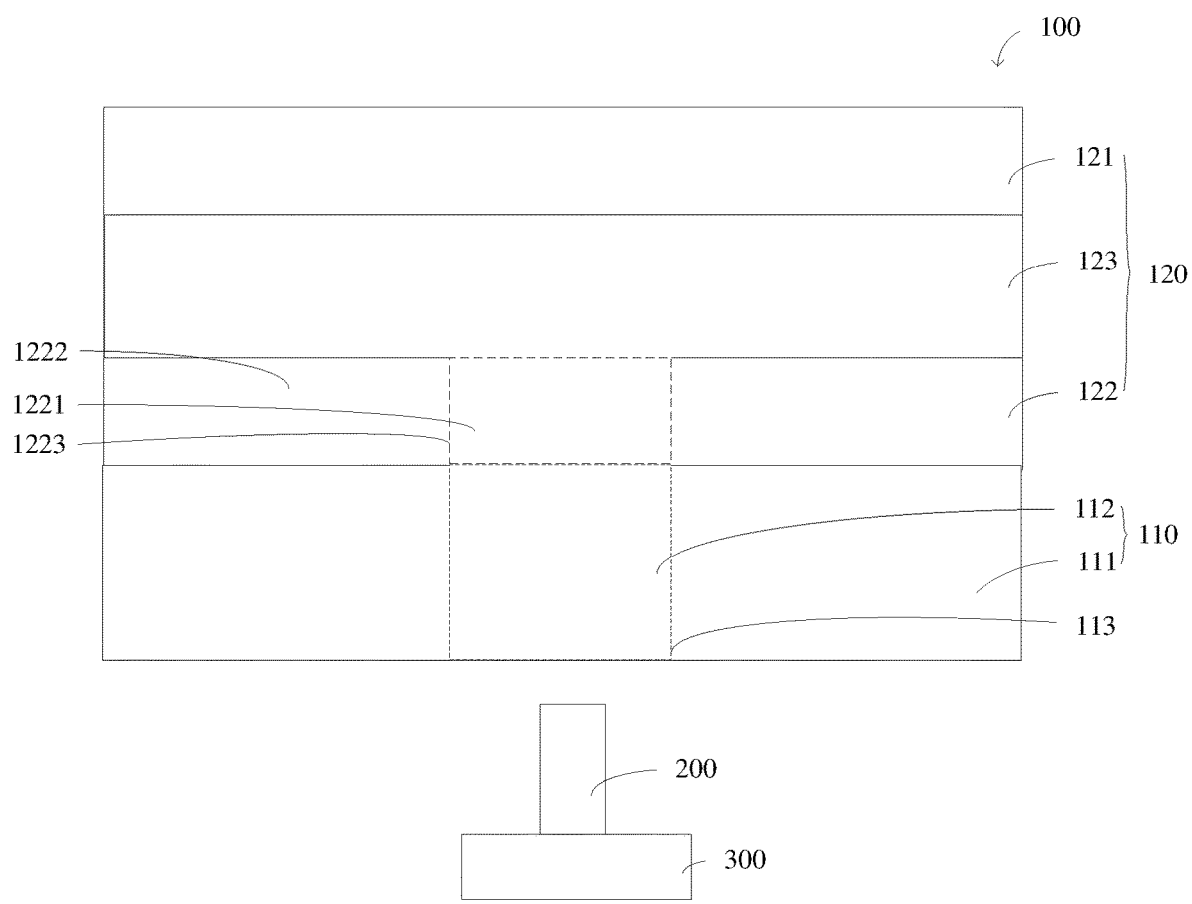
FIG. 1 is a schematic diagram of a partial structure of an electronic device according to an embodiment of the present disclosure.
Figure 2:
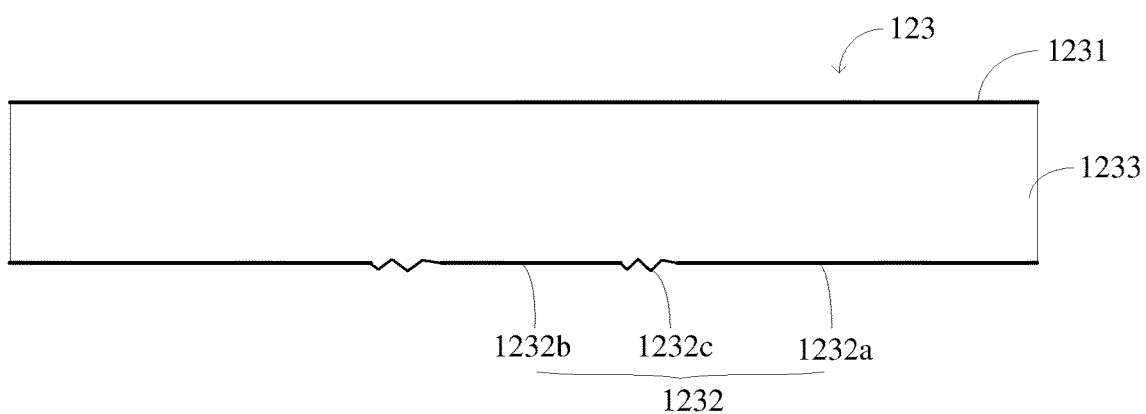
FIG. 2 is a schematic structural diagram of a liquid crystal layer.

Reference numerals in the accompanying drawings are as follows:
100—display module;
110—backlight module;
111—fixed backlight component;
112—movable backlight component;
113—first sliding hole;
120—liquid crystal display;
121—first base assembly; 1211—first indium tin oxide (ITO) layer; 1212—color filter (CF) layer; 1213—upper glass plate; 1214—upper polarizer;
122—second base assembly; 1221—movable block; 1222—fixed block; 1223—second sliding hole; 122*a*—lower polarizer; 122*b*—lower glass plate; 122C—TFT layer; 122*d*—second ITO layer;
123—liquid crystal layer; 1231—first film layer; 1232—second film layer; 1232*a*—fixed area; 1232*b*—movable area; 1232*c*—elastic connection area; 1233—liquid crystal particle;
200—camera; and
300—drive structure.

DETAILED DESCRIPTION OF EMBODIMENTS

To make the objectives, technical solutions, and advantages of the present disclosure clearer, the following clearly describes the technical solutions in the present disclosure with reference to embodiments of the present disclosure and the corresponding accompanying drawings. Apparently, the described embodiments are merely some rather than all of the embodiments of the present disclosure. All other embodiments obtained by a person of ordinary skill in the art based on the embodiments of the present disclosure shall fall within the protection scope of the present disclosure.

Currently, a display module usually includes a liquid crystal display and a backlight module. The liquid crystal display does not have a light-emitting function, so that the backlight module needs to provide backlight, thereby implementing a display function of the liquid crystal display. In this case, an area of the backlight module opposite to a camera needs to be designed to be a light-transmitting area; and an area of the liquid crystal display opposite to the camera, also needs to be designed to be a light-transmitting area. However, light transmittance of the light-transmitting area impacts a shooting effect of the camera.

In a working process of the liquid crystal display, an arrangement manner of liquid crystal particles in a liquid crystal layer of the liquid crystal display is controlled via an electric field, thereby displaying a picture. However, the liquid crystal layer is relatively thick, the light transmittance is affected. As a result, light-transmitting performance of the light-transmitting area is poor, which causes a poor shooting effect of the camera.

To resolve this problem, in a current electronic device, a liquid crystal layer in an area, opposite to a light-transmitting area, of a liquid crystal display is hollowed out. In this case, the liquid crystal display has an area in which displaying cannot be performed. Finally, display performance of the electronic device is affected. In addition, appearance of the electronic device is also affected.

The following describes in detail the technical solutions disclosed in the embodiments of the present disclosure with reference to the accompanying drawings.

Referring to FIG. 1 to FIG. 4, the embodiments of the present disclosure disclose an electronic device. The disclosed electronic device includes a housing, a display module 100, a camera 200, and a drive structure 300.

The housing is a basic component of the electronic device and can provide a mounting foundation for other components of the electronic device. In this embodiment of the present disclosure, all of the display module 100, the camera 200, and the drive structure 300 are directly or indirectly mounted in the housing.

The display module 100 is a display structural member of the electronic device, and can implement presentation of display content. The display module 100 is mounted on the housing. In an implementation, the display module 100 may be fixed on the housing in a bonding manner. The display module 100 and the housing form an inner cavity. The camera 200 is disposed in the inner cavity and is in a space covered by the display module 100. An area, opposite to the camera 200, of the display module 100 is a light-transmitting area. The camera 200 can perform shooting through the light-transmitting area of the display module 100. Disposing the light-transmitting area on the display module 100 to facilitate shooting of the camera 200 is a well-known technology. Details are not described herein again.

In this embodiment of the present disclosure, the display module 100 includes a backlight module 110 and a liquid crystal display 120. The backlight module 110 is disposed between the liquid crystal display 120 and the camera 200. The backlight module 110 is configured to supplement light for the liquid crystal display 120, thereby implementing displaying of the liquid crystal display 120. The backlight module 110 may be fixedly connected to the liquid crystal display 120. For example, the backlight module 110 is fixedly connected to the liquid crystal display 120 via bonding.

The backlight module 110 includes a fixed backlight component 111 and a movable backlight component 112. The fixed backlight component 111 may be fixedly connected to the liquid crystal display 120, thereby implementing assembly between the entire backlight module 110 and the liquid crystal display 120. A first sliding hole 113 is formed in the fixed backlight component 111. The first sliding hole 113 is disposed opposite to the camera 200. The movable backlight component 112 is slidably disposed in the first sliding hole 113, so that the movable backlight component 112 and the fixed backlight component 111 can slide relative to each other. Because the camera 200 is disposed opposite to the first sliding hole 113, and the movable backlight component 112 is disposed in the first sliding hole 113, the movable backlight component 112 is a partial structure of the light-transmitting area.

The liquid crystal display 120 includes a first base assembly 121, a second base assembly 122, and a liquid crystal layer 123 disposed between the first base assembly 121 and the second base assembly 122. The second base assembly 122 is disposed between the liquid crystal layer 123 and the backlight module 110. In this embodiment of the present disclosure, the second base assembly 122 includes a movable block 1221, and the movable block 1221 is disposed opposite to the movable backlight component 112. Therefore, the movable block 1221 is a partial structure of the light-transmitting area, that is, the camera 200 can shoot an image through the movable block 1221, the movable backlight component 112, a part of the liquid crystal layer 123, and the first base assembly 121.

Optionally, the second base assembly 122 may further include a fixed block 1222. The movable block 1221 can move relative to the fixed block 1222. For example, the fixed block 1222 may be provided with a second sliding hole 1223, and the movable block 1221 is slidably disposed in the second sliding hole 1223 in the fixed block 1222, so that the movable block 1221 can move relative to the fixed block 1222.

Because the movable backlight component 112 is slidably disposed in the first sliding hole 113 in the fixed backlight component 111, when the movable backlight component 112 moves towards the movable block 1221, the movable block 1221 can move along with the movable backlight component 112 after the movable backlight component 112 is in contact with the movable block 1221. When moving along with the movable backlight component 112, the movable block 1221 can squeeze the liquid crystal layer 123.

The drive structure 300 is in driving connection with the camera 200. The drive structure 300 can drive the camera 200 to move towards the movable backlight component 112. The drive structure 300 can drive, via the camera 200, the movable backlight component 112 and the movable block 1221 to squeeze the liquid crystal layer 123, so that an area of the liquid crystal layer 123 opposite to the movable block 1221 becomes thinner, that is, an area of the liquid crystal layer 123 opposite to the camera 200 becomes thinner. After the area of the liquid crystal layer 123 opposite to the camera 200 becomes thinner, light transmittance of the area is increased, so that the camera 200 can obtain more light. Therefore, shooting quality of the camera 200 can be better.

The electronic device disclosed in the embodiments of the present disclosure is obtained by improving a structure of an existing electronic device. A backlight module 110 is divided into a fixed backlight component 111 and a movable backlight component 112, and the movable backlight component 112 can slide in a first sliding hole 113 formed in the fixed backlight component 111. In addition, a second base assembly 122, disposed between a liquid crystal layer 123 and a camera 200, of a liquid crystal display 120 is designed to be a structure including a movable block 1221, so that both the movable block 1221 and the movable backlight component 112 are disposed opposite to the camera 200. The camera 200 can shoot an image through the movable block 1221, the movable backlight component 112, the liquid crystal layer 123, and the first base assembly 121. In a shooting process of the camera 200, a drive structure 300 can drive the camera 200 to move, so that the camera 200 moves towards the movable backlight component 112. The drive structure 300 drives the camera 200 to move, so that the camera 200 drives the movable backlight component 112 and the movable block 1221 to squeeze the liquid crystal layer 123. After being squeezed, liquid crystal particles in the liquid crystal layer 123 deform or move, so that an area of the liquid crystal layer 123 opposite to the camera 200 becomes thinner. Therefore, more light can sequentially penetrate through the movable block 1221 and the movable backlight component 112 after passing through the thinned area, to enter the camera 200, which can better meet shooting requirements of the camera 200.

The shooting quality of the foregoing camera 200 can be improved, so that liquid crystal particles in the area, opposite to the camera 200, of the liquid crystal layer 123 do not need to be hollowed out. Therefore, impacts on display performance and appearance of the electronic device can be avoided.

As described above, a partial area of the liquid crystal layer 123 is squeezed and becomes thinner. In the process of thinning, liquid crystal particles disposed in this area may be squeezed to another area of the liquid crystal layer 123. After a squeezing force is withdrawn, these liquid crystal particles may return to their original positions. Certainly, part of the liquid crystal particles in the squeezed area may be filled in an accommodating structure newly formed due to squeezing (for example, an annular liquid crystal accommodating component in the following). After the squeezing force is withdrawn, the newly formed accommodating structure disappears; and the liquid crystal particles in the squeezed area may return to their original positions.

In this embodiment of the present disclosure, the liquid crystal layer 123 may have various structures. Still referring to FIG. 2, in an optional solution, the liquid crystal layer 123 may include a first film layer 1231, a second film layer 1232, and liquid crystal particles 1233 disposed between the first film layer 1231 and the second film layer 1232 in an array. A manner of disposing the liquid crystal particles 1233 in an array is a related technology. Details are not described herein again.

Figure 3:
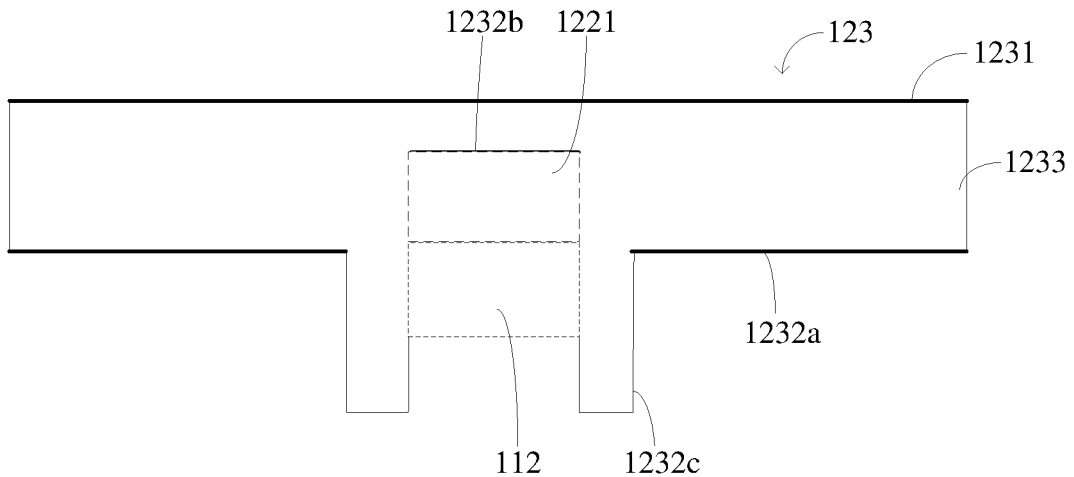
FIG. 3 is a schematic structural diagram of a liquid crystal layer after deformation.

The second film layer 1232 faces the second base assembly 122. The first film layer 1231 faces the first base assembly 121. The second film layer 1232 includes a fixed area 1232a, a movable area 1232b, and an elastic connection area 1232c. The elastic connection area 1232c may be deformed with squeezing of the movable backlight component 112 and the movable block 1221, to form an annular liquid crystal accommodating component protruding from the fixed area 1232a. Part of the liquid crystal particles 1233 are filled in the annular liquid crystal accommodating component. The movable area 1232b is disposed opposite to the movable backlight component 112 and the movable block 1221. In a moving process of the movable backlight component 112 and the movable block 1221, the movable area 1232b moves along with the movable backlight component 112 and the movable block 1221. As shown in FIG. 3, the elastic connection area 1232c has elasticity, so that in a moving process of the movable area 1232b, the elastic connection area 1232c is squeezed to deform, thereby forming the annular liquid crystal accommodating component. The formed annular liquid crystal accommodating component can form an additional space that provides a temporary storage location for the liquid crystal particles 1233 in the squeezed area. Therefore, these liquid crystal particles 1233 are prevented from excessively squeezing liquid crystal particles 1233 in another area (un-squeezed area) of the liquid crystal layer 123, which can avoid deficient display that may be generated in the un-squeezed area.

For better accommodation of the annular liquid crystal accommodating component, in an optional solution, an accommodating gap may be formed between the fixed backlight component 111 and the movable backlight component 112. Because the backlight module 110 can supplement light for the entire liquid crystal display 120 in a relatively large area, the accommodating gap does not affect a light supplementing effect of the backlight module 110. In addition, an accommodating space can be provided for an additionally formed annular liquid crystal accommodating component. Therefore, the elastic connection area 1232c may be deformed more easily, thereby forming the annular liquid crystal accommodating component more easily.

Certainly, when the elastic connection area 1232c is squeezed to deform, a liquid crystal accommodating component of another form, in addition to the annular liquid crystal accommodating component, may also be formed. On the premise that the elastic connection area 1232c is squeezed to form the annular liquid crystal accommodating component, an orthographic projection, in a direction perpendicular to the liquid crystal display 120, of a lens of the camera 200 is located in an area surrounded by the annular liquid crystal accommodating component. In this case, the annular liquid crystal accommodating component can protect the lens in all directions, so that other stray light in the electronic device is prevented from being incident to the lens, and then, an impact of the stray light on shooting of the camera 200 can be avoided. In another optional solution, when the camera 200 is driven by the drive structure 300, the lens of the camera 200 can extend into a space surrounded by the annular liquid crystal accommodating component, thereby achieving a better anti-interference effect.

As described above, the elastic connection area 1232c is an area used to form the annular liquid crystal accommodating component. To make the elastic connection area 1232c be deformed more easily without causing another area of the liquid crystal layer 123 to be deformed relatively greatly, in an optional solution, an elastic coefficient of the elastic connection area 1232c may be less than elastic coefficients of the fixed area 1232a and the movable area 1232b, so that the elastic connection area 1232c can be deformed more easily. Certainly, in other words, a thickness of the elastic connection area 1232c may be less than thicknesses of the fixed area 1232a and the movable area 1232b. Because the thickness of the elastic connection area 1232c is relatively small, strength of the elastic connection area 1232c is relatively small, which makes the elastic connection area 1232c easier to be deformed. Generally, the second film layer 1232 is made of a same material. Therefore, the thickness of the elastic connection area 1232c is designed to be relatively small, thereby making a purpose easier to achieve.

Figure 4:
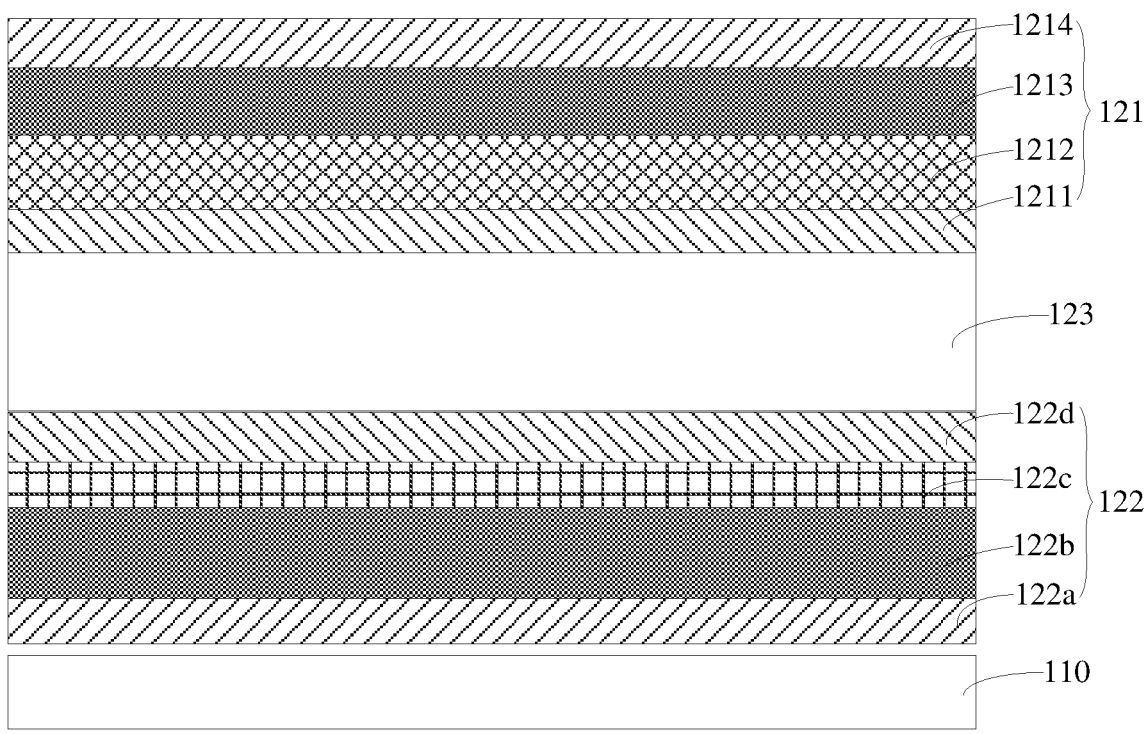
FIG. 4 is a schematic structural diagram of a display module.

In this embodiment of the present disclosure, the first base assembly 121 may have various structures. Referring to FIG. 4, the first base assembly 121 may include a first ITO layer 1211, a CF layer 1212, an upper glass plate 1213, and an upper polarizer 1214 that are sequentially stacked on the liquid crystal layer 123.

Similarly, the second base assembly 122 may have various structures. Referring to FIG. 4, the second base assembly 122 may include a lower polarizer 122a, a lower glass plate 122b, a thin film transistor (TFT) layer 122c, and a second ITO layer 122d that are sequentially stacked between the backlight module 110 and the liquid crystal layer 123.

In this embodiment of the present disclosure, the drive structure 300 can drive the camera 200 to move towards the movable backlight component 112. There may be various types of drive structures 300. For example, the drive structure may be a hydraulic telescopic component, a pneumatic telescopic component, a linear motor, a screw drive structure, or the like. In the embodiments of the present disclosure, a type of the drive structure 300 is not limited.

In an optional solution, the drive structure 300 may be a shape memory deforming alloy structure. When the shape memory deforming alloy structure is electrified, the camera 200 can move via deformation of the drive structure 300. The shape memory deforming alloy structure has the advantages that the structure is relatively simple, the cost is relatively low, and the occupied space is relatively small.

Both the camera 200 and the shape memory deforming alloy structure need to be electrified in a working process. To facilitate mounting and power supply connection, in an optional solution, the electronic device disclosed in this embodiment of the present disclosure includes a circuit board (for example, a mainboard) disposed in an inner cavity. The camera 200 is supported on the circuit board via the shape memory deforming alloy structure. Both the shape memory deforming alloy structure and the camera 200 are electrically connected to the circuit board.

The electronic device disclosed in the embodiments of the present disclosure may be a mobile phone, a tablet computer, an e-book reader, a game console, an in-vehicle navigator, a smart watch, or the like. In the embodiments of the present disclosure, a type of the electronic device is not limited.

Based on the electronic device in this embodiment of the present disclosure, an embodiment of the present disclosure discloses a control method of an electronic device. The electronic device is the electronic device described above. The control method may include the following steps.

S101: Receive a first input.

S102: Drive, via the drive structure 300 in response to the first input, the camera 200 to move towards the movable backlight component 112 and the movable block 1221.

In step S101, the first input may be a voice input, a text input, a keystroke input, or the like.

In step S102, the drive structure 300 drives the camera 200 to move towards the movable backlight component 112 and the movable block 1221, thereby squeezing the liquid crystal layer 123 via the movable backlight component 112 and the movable block 1221. Finally, an area of the liquid crystal layer 123 opposite to the movable block 1221 becomes thinner, thereby increasing light transmittance of the area.

Based on the control method in this embodiment of the present disclosure, an embodiment of the present disclosure discloses an electronic device. The electronic device may include a receiving unit and a control unit.

The receiving unit is configured to receive a first input. The first input may be a voice input, a text input, a keystroke input, or the like.

The control unit is configured to drive, via the drive structure 300 in response to the first input, the camera 200 to move towards the movable backlight component 112 and the movable block 1221.

Based on the control method in the embodiments of the present disclosure, an embodiment of the present disclosure discloses an electronic device, including a processor, a memory, and a computer program stored in the memory and executable on the processor. When the computer program is executed by the processor, the foregoing control method is implemented.

The processor may include but is not limited to a general-purpose processor, a special-purpose processor, an application specific processor, or a field-programmable processor.

The memory may include a read-only memory (ROM), a random access memory (RAM), a magnetic disk storage medium device, an optical storage medium device, a flash storage device, and an electrical, optical, or another physical/tangible storage device.

Based on the control method in the embodiments of the present disclosure, an embodiment of the present disclosure discloses a non-transitory computer-readable storage medium. The non-transitory computer-readable storage medium stores a computer program, and when the computer program is executed, the foregoing control method is implemented.

The non-transitory computer-readable storage medium may be a ROM, a RAM, a magnetic disk, or an optical disc.

The foregoing embodiments of the present disclosure focus on describing differences between the embodiments, and different optimization features of the embodiments may be combined to form better embodiments provided that they are not contradictory. For brevity, details are not described herein again.

The foregoing descriptions are merely embodiments of the present disclosure, but are not intended to limit the present disclosure. For a person skilled in the art, the present disclosure may have various changes and variations. Any modification, equivalent replacement, or improvement made without departing from the spirit and principle of the present disclosure shall fall within the scope of the claims of the present disclosure.

What is claimed is:

1. An electronic device, comprising a housing, a display module, a camera, and a drive structure, wherein the camera and the drive structure are disposed in an inner cavity formed by the display module and the housing;

the display module comprises a backlight module and a liquid crystal display, wherein the backlight module is disposed between the liquid crystal display and the camera;

the backlight module comprises a fixed backlight component and a movable backlight component, wherein a first sliding hole is formed in the fixed backlight component, the first sliding hole is formed opposite to the camera, and the movable backlight component is slidably disposed in the first sliding hole;

the liquid crystal display comprises a first base assembly, a second base assembly, and a liquid crystal layer disposed between the first base assembly and the second base assembly, the second base assembly is disposed between the liquid crystal layer and the backlight module, the second base assembly comprises a movable block, and the movable block is disposed opposite to the movable backlight component; and the drive structure is connected with the camera, the drive structure drives the camera to move towards the movable backlight component, and the drive structure drives, via the camera, the movable backlight component and the movable block to squeeze the liquid crystal layer, so that an area of the liquid crystal layer opposite to the movable block becomes thinner.

2. The electronic device according to claim 1, wherein the liquid crystal layer comprises a first film layer, a second film layer, and liquid crystal particles disposed between the first film layer and the second film layer in an array, the second film layer faces the second base assembly, the second film layer comprises a fixed area, a movable area, and an elastic connection area, the elastic connection area is deformed with squeezing of the movable backlight component and the movable block to form an annular liquid crystal accommodating component protruding from the fixed area, and part of the liquid crystal particles are filled in the annular liquid crystal accommodating component.

3. The electronic device according to claim 2, wherein an accommodating gap is formed between the fixed backlight component and the movable backlight component, and the annular liquid crystal accommodating component is disposed in the accommodating gap.

4. The electronic device according to claim 2, wherein an elastic coefficient of the elastic connection area is less than elastic coefficients of the fixed area and the movable area.

5. The electronic device according to claim 2, wherein a thickness of the elastic connection area is less than thicknesses of the fixed area and the movable area.

6. The electronic device according to claim 2, wherein an orthographic projection, in a direction perpendicular to the liquid crystal display, of a lens of the camera is located in an area surrounded by the annular liquid crystal accommodating component.

7. The electronic device according to claim 2, wherein the movable area is disposed opposite to the movable backlight component and the movable block, and in a moving process of the movable backlight component and the movable block, the movable area moves along with the movable backlight component and the movable block.

8. The electronic device according to claim 2, wherein in a case where the camera is driven by the drive structure, a lens of the camera extends into a space surrounded by the annular liquid crystal accommodating component.

9. The electronic device according to claim 1, wherein the first base assembly comprises a first indium tin oxide (ITO) layer, a color filter (CF) layer, an upper glass plate, and an upper polarizer that are sequentially stacked on the liquid crystal layer.

10. The electronic device according to claim 1, wherein the second base assembly comprises a lower polarizer, a lower glass plate, a thin film transistor (TFT) layer, and a second indium tin oxide (ITO) layer that are sequentially stacked between the backlight module and the liquid crystal layer.

11. The electronic device according to claim 1, wherein the drive structure is a shape memory deforming alloy structure.

12. A control method of an electronic device, wherein the electronic device comprises a display module, a camera, and a drive structure, the display module comprises a backlight module and a liquid crystal display, the backlight module comprises a fixed backlight component and a movable backlight component, the liquid crystal display comprises a first base assembly, a second base assembly, and a liquid crystal layer disposed between the first base assembly and the second base assembly, the second base assembly comprises a movable block, the movable block is disposed opposite to the movable backlight component, the drive structure is connected with the camera; and the control method comprises:

receiving a first input; and driving, via the drive structure in response to the first input, the camera to move towards the movable backlight component and the movable block.

13. An electronic device, comprising a display module, a camera, and a drive structure, wherein the display module comprises a backlight module and a liquid crystal display, the backlight module comprises a fixed backlight component and a movable backlight component, the liquid crystal display comprises a first base assembly, a second base assembly, and a liquid crystal layer disposed between the first base assembly and the second base assembly, the second base assembly comprises a movable block, the movable block is disposed opposite to the movable backlight component, the drive structure is connected with the camera; and the electronic device further comprises a processor, a memory, and a computer program stored in the memory and executable on the processor, and the computer program, when executed by the processor, causes the electronic device to perform:

receiving a first input; and driving, via the drive structure in response to the first input, the camera to move towards the movable backlight component and the movable block.

\* \* \* \* \*